United States Patent
Takatori et al.

(10) Patent No.: US 6,625,532 B2
(45) Date of Patent: Sep. 23, 2003

(54) SOLENOID CONTROL METHOD AND APPARATUS FOR AUTOMATIC TRANSMISSION

(75) Inventors: Kazuhiro Takatori, Yokohama (JP); Osamu Sato, Kanagawa (JP); Tatsuya Imamura, Kanagawa (JP); Yasushi Fujita, Kanagawa (JP); Kazuo Tomioka, Shizuoka (JP); Kazuhito Sano, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/055,950

(22) Filed: Jan. 28, 2002

(65) Prior Publication Data

US 2002/0103591 A1 Aug. 1, 2002

(30) Foreign Application Priority Data

Jan. 30, 2001 (JP) ........................................ 2001-021653

(51) Int. Cl.$^7$ ................................................ G06F 7/00
(52) U.S. Cl. .............................. 701/51; 701/86; 477/34; 477/45
(58) Field of Search ................................. 701/1, 51, 86, 701/87; 477/34, 45, 146, 164

(56) References Cited

U.S. PATENT DOCUMENTS 5,483,446 A * 1/1996 Momose et al. ................ 701/1
6,208,498 B1 3/2001 Ueda .......................... 361/160

* cited by examiner

Primary Examiner—Gertrude Arthur
(74) Attorney, Agent, or Firm—Foley & Lardner

(57) ABSTRACT

In solenoid control method and apparatus for an automatic transmission, a current signal varied in a stepwise manner is caused to pass through a filter having a predetermined transfer function, the current signal being inputted to a solenoid to drive a control valve by which a working oil pressure on at least one frictional element of the automatic transmission is controlled by reducing the working oil pressure to release the frictional element and the filter passed current signal is inputted to the solenoid to drive the control valve. The solenoid control method and apparatus described above are applicable to a change-over shift operation.

7 Claims, 8 Drawing Sheets

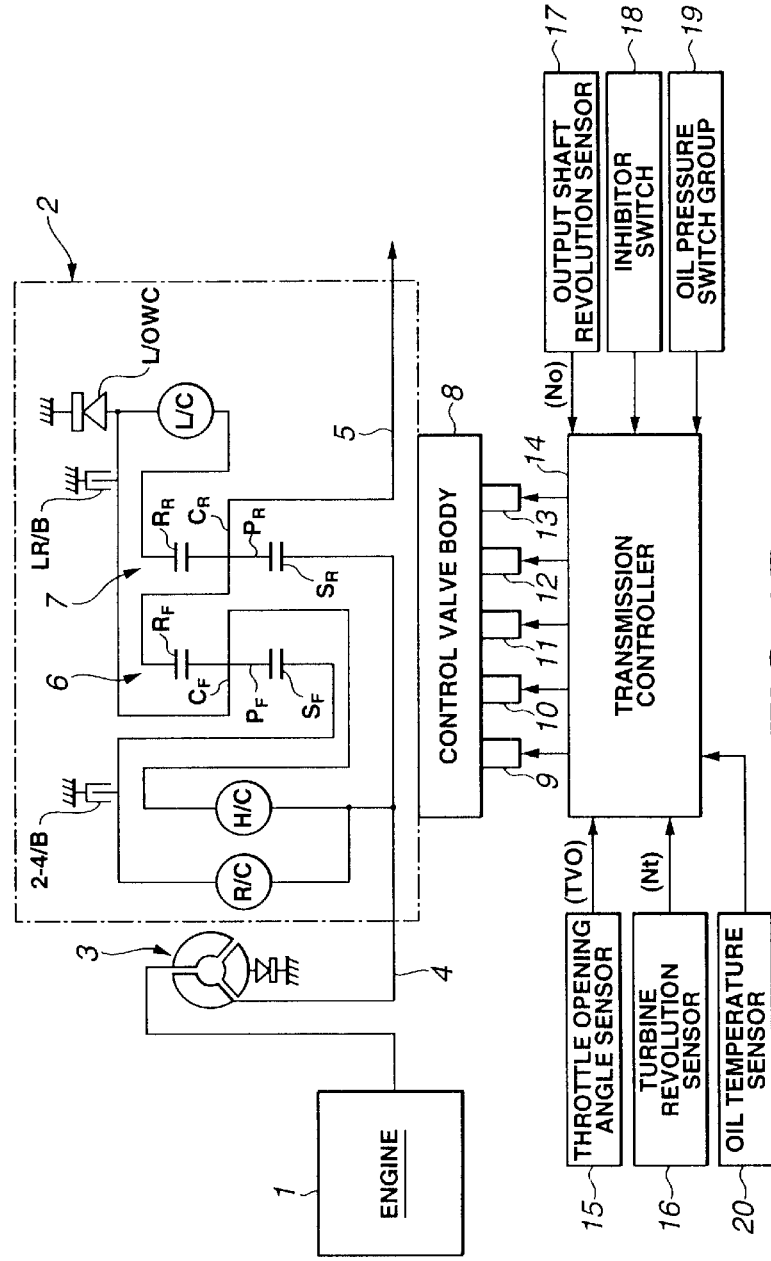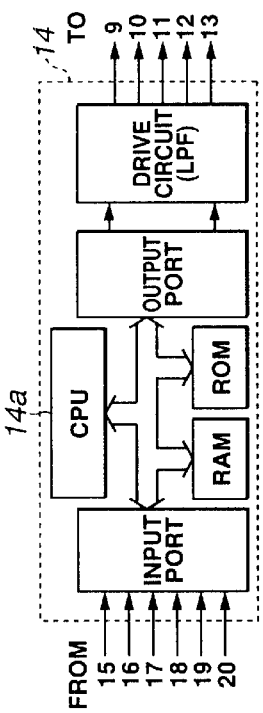

FIG.2

|   | R/C | H/C | L/C | LR/B | L/OWC | 2-4/B |
|---|---|---|---|---|---|---|
| 1st |  |  | ○ | ○ | ○ |  |
| 2nd |  |  | ○ |  |  | ○ |
| 3rd |  | ○ | ○ |  |  |  |
| 4th |  | ○ |  |  |  | ○ |
| Rev | ○ |  |  | ○ |  |  |

SOLENOID CONTROL METHOD AND APPARATUS FOR AUTOMATIC TRANSMISSION

BACKGROUND OF THE INVENTION

1. Field of the Invention

The present invention relates to control method and apparatus for a solenoid operation to drive a control valve used to control an oil pressure in an automatic transmission in which gear shift operations are carried out by clutch and release operations of frictional elements through a control of the oil pressure.

2. Description of the Related Art

The automatic transmission is generally constituted by frictional elements such as a plurality of clutches and brakes which are selectively and hydraulically operated (clutched and released) so that a power transmission route (gear-speed range) of a gear transmission system is determined and the operating frictional element is switched to perform a shift to another gear-speed range. In details, the clutch of a certain frictional element is carried out by raising a working oil pressure on the frictional element and the release of the certain frictional element is carried out by lowering the working oil pressure of the frictional element. Such a control of a working oil pressure as described above is carried out by varying a level of a current inputted to an electromagnetic control valve (a linear solenoid valve) driven by an electric current signal prepared to enable the working oil pressure to be set to an arbitrary value. A current command value is divided into several steps from a minimum value to a maximum value according to an arithmetic operation capability of a control purpose computer. Therefore, a relationship between an oil pressure value (oil pressure command value) set as a value of a working fluid pressure and the frictional element to be clutched or released is formed in a stepwise manner. That is to say, a current to be inputted to the solenoid corresponding to the oil pressure is varied in a stepwise manner.

SUMMARY OF THE INVENTION

In order to perform a control over a certain control valve as described above, the following inconveniences occur. That is to say, suppose that the oil pressure of the control valve is varied with an elapse of time and, thereafter, such a control that the oil pressure is maintained constant is carried out. In this case, a variation in a hydraulic (working oil pressure) target value and actual working oil pressure (actual hydraulic or actual oil pressure) is varied in the stepwise manner in accordance with the level of the current signal inputted to its solenoid of the control valve. Hence, the oil pressure command value is shifted in the stepwise manner with respect to the oil pressure target value. In addition, in a case where the oil pressure is maintained constant (shell pressure) and the oil pressure target value indicates an approximate value intermediate between one step of the stepwise current, the oil pressure command value is actually given as an oscillating waveform.

On the other hand, the actual working oil pressure is shifted in a critical damping manner due to a mechanical response delay or due to a viscosity resistance of the working oil. At this time, a time delay, a surge, and a variation (oil vibration) of the working oil pressure occur until the actual working oil pressure has reached to the target value. These phenomena provide causes of shift shock and response delay in a shift operation in the automatic transmission. Especially in a case where one of two frictional elements is clutched while the other frictional element is released so that a shift operation is carried out (this gear shift operation is called a change-over gear shift), an engine racing often occurs due to a deviation in timing of both clutch and release operations of the corresponding two frictional elements.

It is, therefore, an object of the present invention to provide solenoid control method and apparatus for an automatic transmission in which abrupt rise or fall of a waveform of the oil pressure command value is relieved so as to suppress response delay and surge developed on actual oil pressure by filtering a current signal varied in a stepwise manner and to be inputted to a solenoid to drive a control valve of the automatic transmission to achieve a predetermined shift operation.

According to one aspect of the present invention, there is provided a solenoid control method for an automatic transmission, comprising: causing a current signal varied in a stepwise manner to pass through a filter having a predetermined transfer function, the current signal being inputted to a solenoid to drive a control valve by which a working oil pressure on at least one frictional element of the automatic transmission is controlled to perform a predetermined shift operation by reducing the working oil pressure to release the frictional element; and inputting the filter passed current signal to the solenoid to drive the control valve.

According to another aspect of the present invention, there is provided a solenoid control apparatus for an automatic transmission, comprising: a filter process section that causes a current signal varied in a stepwise manner to pass through a filter having a predetermined transfer function, the current signal being inputted to a solenoid to drive a control valve by which a working oil pressure of at least one frictional element of the automatic transmission is controlled to perform a predetermined shift operation by reducing the working oil pressure to release the frictional element; and a current inputting section that inputs the filter passed current signal to the solenoid to drive the control valve.

This summary of the invention does not necessarily describe all necessary features so that the invention may also be a sub-combination of these described features.

BRIEF DESCRIPTION OF THE DRAWINGS

FIG. 1A is a rough configuration of an automatic transmission to which a preferred embodiment of a solenoid control method according to the present invention is applicable.

FIG. 1B is schematic circuit block diagram of a transmission controller shown in FIG. 1.

FIG. 2 is a characteristic graph representing a relationship between a selected gear speed range of the automatic transmission shown in FIG. 1A and clutching logics of respective frictional elements of the automatic transmission shown in FIG. 1A.

DETAILED DESCRIPTION OF THE PREFERRED EMBODIMENT

Figure 3:
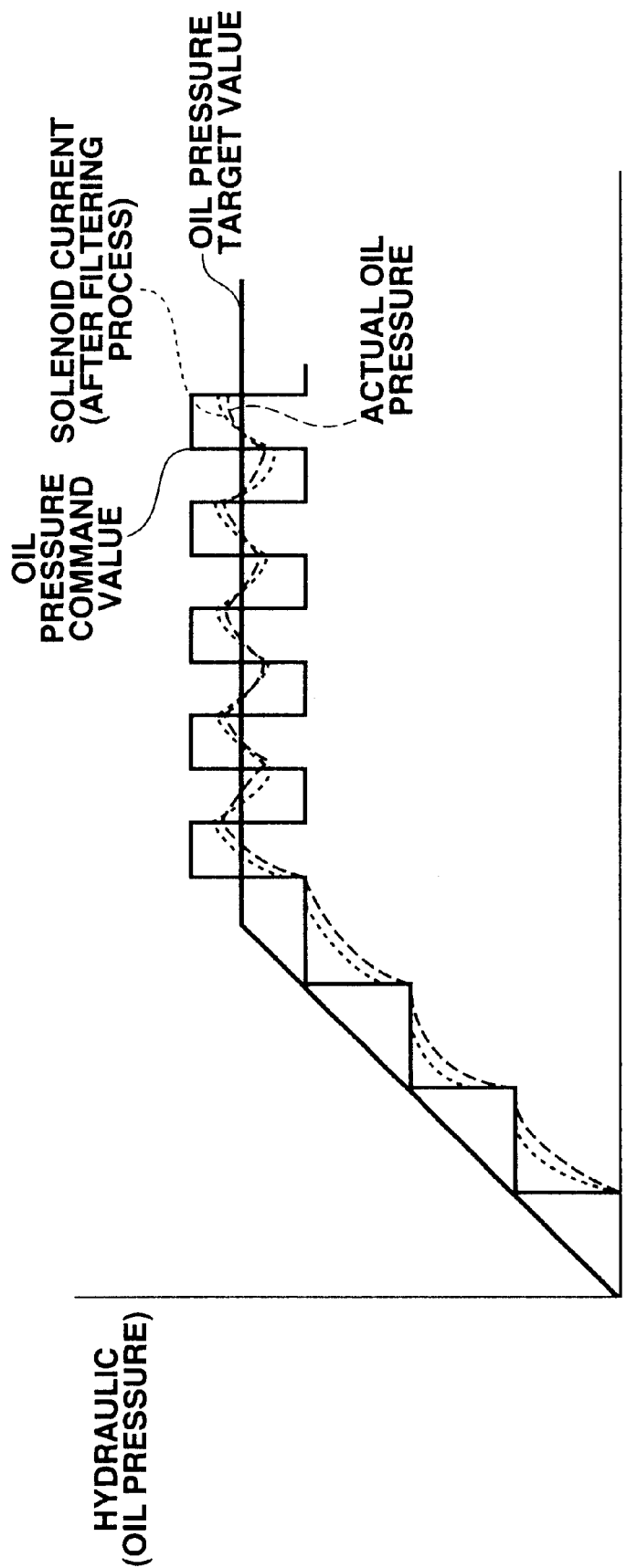
FIG. 3 is a characteristic graph typically representing a variation in an actual oil pressure (actual hydraulic) with respect to an oil pressure command value when a filtering process is executed for a current signal to be inputted to a solenoid to drive a control valve shown in FIG. 1A.

Reference will hereinafter be made to the drawings in order to facilitate a better understanding of the present invention.

FIG. 1A shows a rough configuration of an automatic transmission in a preferred embodiment according to the present invention.

An output of an engine 1 is adjusted by means of a throttle valve from a full open position to a full closure position whose opening angle is adjusted in accordance with a depression depth off an accelerator pedal by a vehicle driver. An output revolution of engine 1 is outputted to an input shaft 4 of an automatic transmission 2 via a torque converter 3. In automatic transmission 2, input and output shafts are disposed to have a coaxial butt relationship with each other. Then, a front planetary gear group 6 and a rear planetary gear group are a main component of a planetary gear shift mechanism in automatic transmission 2.

Front planetary gear group 6 located at a position nearer to engine 1 is a single planetary gear group including a front sun gear $S_F$, a front ring gear $R_F$, a front position $R_F$ meshed with these sun and ring gears, and a front carrier $C_F$ supporting rotationally the front pinion. Rear planetary gear group 7 which is located remotely from engine 1 is a rear sun gear $S_R$, a rear ring gear $R_R$, a rear pinion $P_R$ to be meshed with these gears, and a rear carrier $C_R$ supporting rotationally the rear pinion.

Furthermore, frictional elements to determine a transmission route (gear shift range) of the planetary gear shift mechanism include low clutch L/C, a second-speed fourth speed brake 2-4/B, a high clutch H/C, a low reverse clutch brake R/B, a one-way clutch L/OWC, and a reverse clutch R/C. These frictional elements are installed so as to have a correlation to the components of both planetary gear groups.

In details, front sun gear $S_F$ is properly connectable to input shaft 4 by means of reverse clutch R/C and properly fixable by means of second-speed/fourth-speed brake 2-4/B.

Front carrier $C_F$ is properly connectable to input shaft 4 by means of a high clutch H/C. Front carrier $C_F$ further clutches a reverse directional rotation to the engine revolution by means of a low one-way clutch L/OWC and is properly fixable by means of a low reverse brake LR/B. Low clutch L/C is properly connectable with low clutch L/C between front carrier $C_F$ and front ring gear $R_F$. A mutual connection between front ring gear $R_F$ and a rear carrier $C_R$ is made, these front ring gear $R_F$ and rear carrier $C_R$ are coupled to output shaft 6, and rear sun gear $S_R$ is coupled to input shaft 4.

Figure 2:
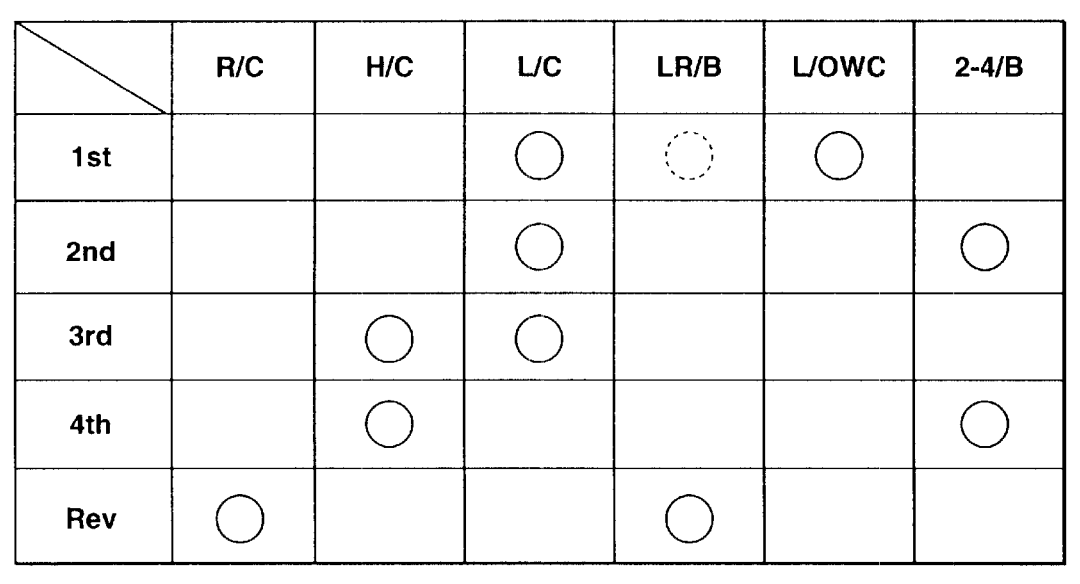

A power transmission row of the planetary gear shift mechanism can achieve a forward gear shift range of a forward first speed (1st), a forward second speed (2nd), a forward third speed (3rd), and a forward fourth speed (4th), and a reverse gear shift range (Rev) according to a selective oil pressure operation (clutch) of the frictional elements L/C, 2-4/B, H/C, LR/B, R/C and a self engagement of the one-way clutch L/OWC. The selective oil pressure operation is denoted by a circle ○ (solid line) shown in FIG. 2. The self-engagement is denoted by a circle ○ of the solid line shown in FIG. 2. It is noted that the oil pressure operation (clutch) denoted by a dotted circle in FIG. 2 is a frictional element (in this case, low reverse brake LR/B) to be operated when an engine brake is needed.

A clutching logic of a gear shift control frictional element L/C, 2-4/B, H/C, LR/B, and R/C shown in FIG. 2 is achieved by a control valve body 8 shown in FIG. 1A. In control valve body 8, a line-pressure solenoid 9, a low clutch solenoid 9, a 2nd-speed/fourth-speed brake solenoid 11, a high clutch solenoid 12, and a low reverse brake solenoid 13 are disposed in addition to a manual value (not shown).

Line pressure solenoid 9 is switched at high and low levels which are original oil pressures of the gear shift control due to the turn-on and turn-off of line pressure solenoid 9. The manual valve (not shown) is operated according to a desired running state by the driver at a forward run (D) range position, a rearward run (R) range position, or parking or neutral (P, N) range position. The manual valve in D range supplies a line pressure to enable an individual control of the working oil pressure of low clutch L/C, 2nd-speed-fourth-speed brake 2-4/B, the high clutch H/C, and a low reverse brake LR/B corresponding to the duty control for the low clutch solenoid 10, 2nd-speed-4th-speed brake solenoid 11, a high-clutch solenoid 12, and a low reverse brake solenoid 13 with the line pressure as an original oil pressure. Hence, a duty control for each corresponding solenoid achieves the clutching logics of the first-speed through fourth-speed shown in FIG. 2.

It is, however, noted that, in the R range, the manual valve directly supplies the line pressure to reverse clutch R/C without dependency upon the duty ratio control of each solenoid. Then, the reverse clutching logic shown in FIG. 2 is achieved by clutching the reverse clutch R/C. In the P and N ranges, the manual valve does not supply the line pressure to any hydraulic circuit so that all frictional elements are released to make automatic transmission neutral.

An on-and-off control for line pressure solenoid 9 and duty controls for low clutch solenoid 10, 2nd-speed-and-4th-speed brake solenoid 11, a high clutch solenoid 12, a low reverse brake solenoid 13 are executed by transmission controller 14. Hence, transmission controller 14 inputs: a signal from a throttle opening sensor 15 to detect a throttle opening angle TVO of engine 1; a signal from a turbine revolution speed Nt which is an output revolution speed of torque converter 3 (namely, an input revolution speed of automatic transmission 2); a signal from an output revolution sensor 17 to detect a revolution speed No of an output shaft of automatic transmission 2; a signal from an inhibitor switch 18 to detect a selected gear speed range and signals from hydraulic switch group 19 disposed within high clutch H/C during an up-shift from 2nd-speed range to 3rd-speed range; 2nd-speed-4th-speed brake 2-4/B during up-shifts of 1st-speedrange to 2nd-speed range and of 3rd-speed range to 4th-speed range. Hydraulic switch group 19 is turned on when the working oil pressure of the corresponding one of the frictional elements indicates a pressure started to generate the clutching capacity with a stroke which does not contributes to the clutch of the corresponding frictional element ended. As described above, a predetermined current signal is supplied to one of the solenoids which corresponds to each frictional element in the stepwise manner or a rectangular waveform manner.

In the solenoid control method according to the present invention, the filtering is executed for the current signal to relieve the abrupt rise and fall of the signal waveform so that the occurrence of the surge and oil vibration in the actual working oil pressure can be suppressed.

FIG. 3 typically shows the oil pressure command value, solenoid current (filter processed), and actual oil pressure in the case of the preferred embodiment.

As shown in FIG. 3, the current signal has a wave form in a stepwise shape and each step in a rectangular shape, the current signal (oil pressure command value) driving the solenoid and being filtered so as to be reshaped in a smooth waveform as denoted by a dot line of FIG. 3. Thereafter, the smooth waveform current signal is inputted to the solenoid. Consequently, the actual oil pressure is smoothed as denoted by a bold broken line of FIG. 3. It will be appreciated that the surge and oil vibration are clearly suppressed.

An actual filtering is carried out as defined below. That is to say, one example of the filter is expressed as follows: A transfer function of the filter (a first order lag element) can be expressed as:

$$G=K/(1+sT),$$

wherein K denotes a gain, s denotes a differential operator (s=d/dt), and T denotes a time constant.

As described in the above equation, the strength of the filter is prescribed according to a magnitude of a value of time constant T. That is to say, as the value of T becomes large, the current signal is processed with the strong filter. As the value of T becomes small, the current signal is processed with a weaker filter.

Figure 4:
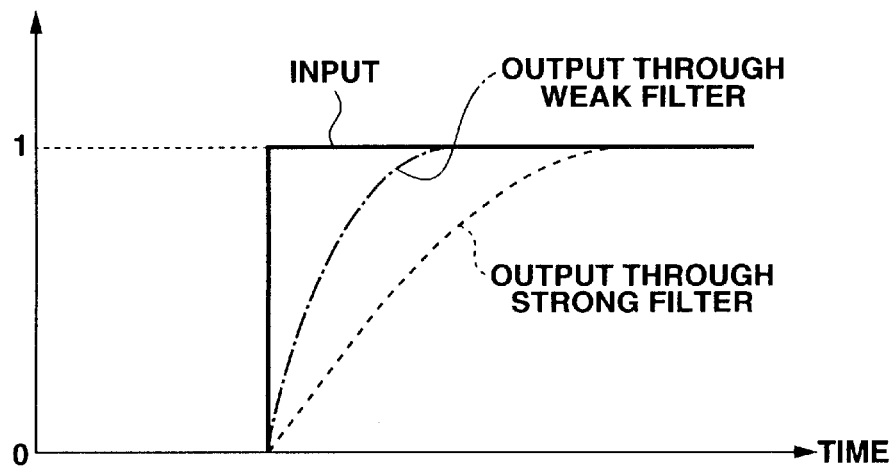
FIG. 4 is a characteristic graph representing output results of the filtered current signal, the filter having different time constants, in response to an input of a unit step function.

FIG. 4 typically shows the comparison of both filtered current signals responded to a stepwise variation. That is to say, in FIG. 4, an output (response) is shown in response to a unit step function as an input. In FIG. 4, in a case where time constant T is large (strong filter), the response is denoted by the broken line of FIG. 4. In a case where time constant T is small (weak filter), the response is denoted by a dot-and-dash line of FIG. 4.

Figure 5:
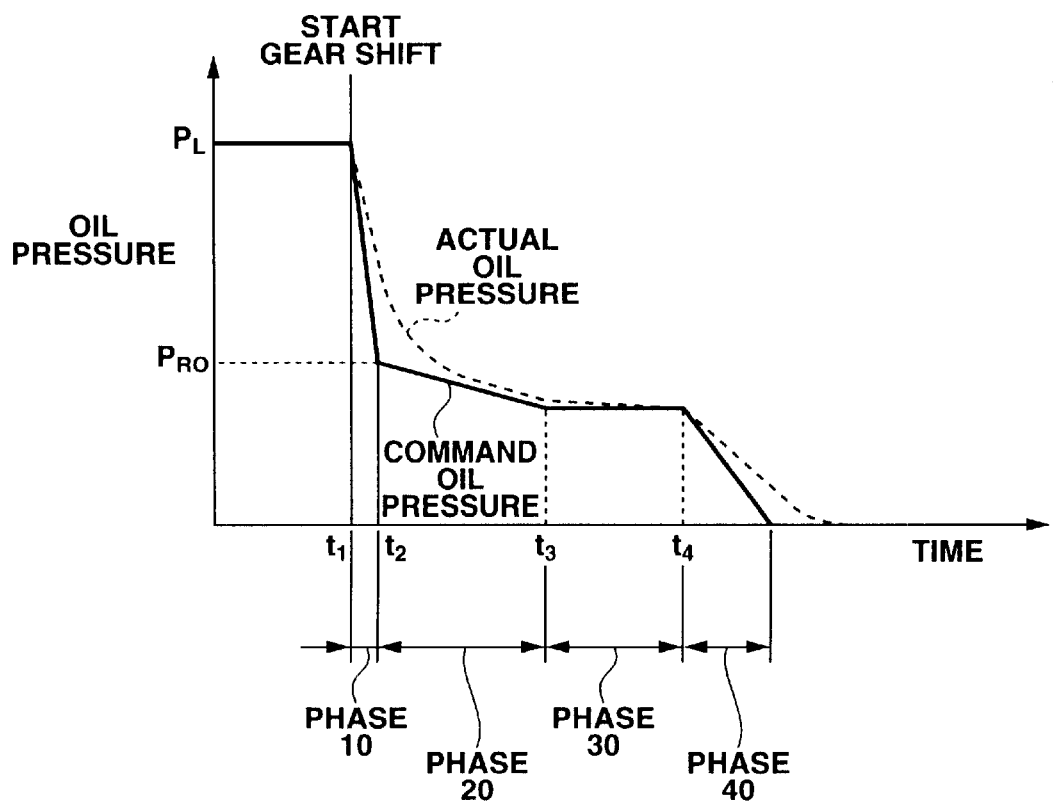
FIG. 5 is a characteristic graph typically representing a variation in an actual oil pressure to the oil pressure command value in a case where a strong filter is executed for the current signal to be inputted to the solenoid to drive a control valve when a corresponding frictional element of the automatic transmission shown in FIG. 1A is released.
Figure 6:
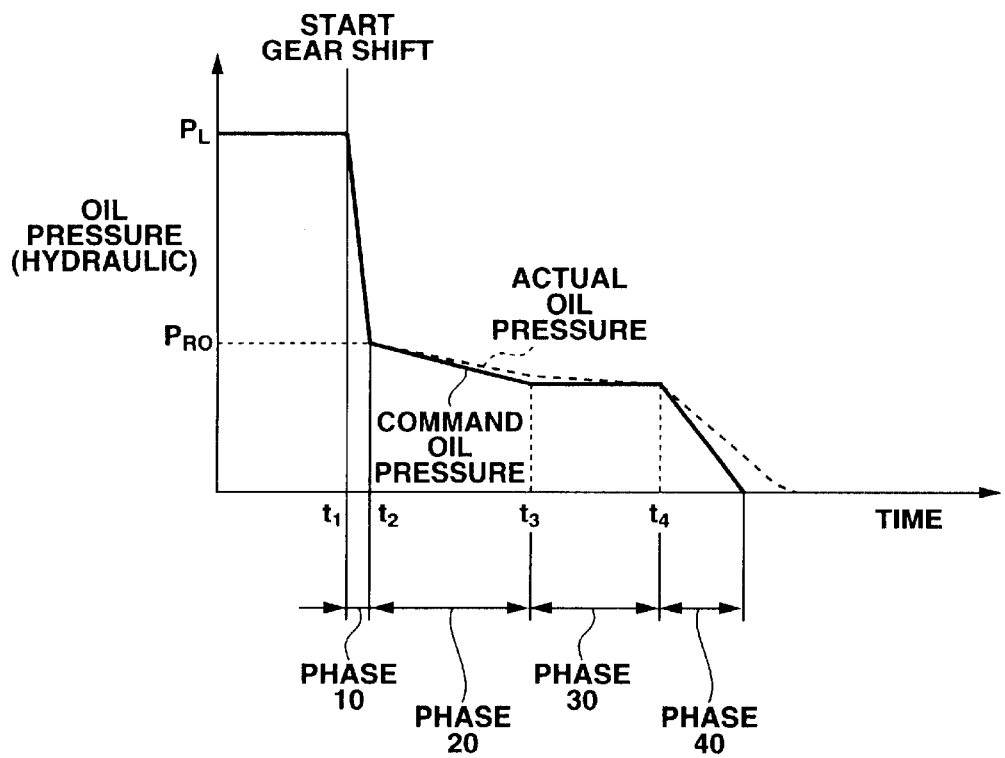
FIG. 6 is a characteristic graph typically representing a variation in the actual oil pressure to the oil pressure command value in a case where a weak filter is executed for the current signal to be inputted to the solenoid to drive the control valve.

According to the present invention, the current signal to be inputted to the solenoid of the control valve which controls the working oil pressure to clutch or release the corresponding frictional element is filtered with the transfer function as described above and, thereafter, is inputted to the solenoid. FIGS. 5 and 6 show timing charts representing the oil pressure control when the filtered current signal is inputted to the solenoid. Especially, FIG. 5 shows the timing chart of the commanded oil pressure and actual oil pressure in a case where the strong filtering is carried out for the current signal to be inputted to the solenoid from an instantaneous time $t_1$ at which a gear shift operation command is issued. FIG. 6 shows the timing chart of the commanded oil pressure and actual oil pressure in a case where the weak filtering is applied to the current signal to be inputted to the solenoid during a time duration from the instantaneous time $t_1$ to an instantaneous time $t_2$ at which the working oil pressure is reduced to reach to a release initial pressure $P_{RO}$ (herein called, phase 10).

According to the respective pressure histories of FIGS. 5 and 6, in a case where the weak filtering is applied to the current signal to be inputted to the solenoid at phase 10 as shown in FIG. 6, is will be appreciated that the actual oil pressure favorably follows the command pressure (command value).

Figure 7:
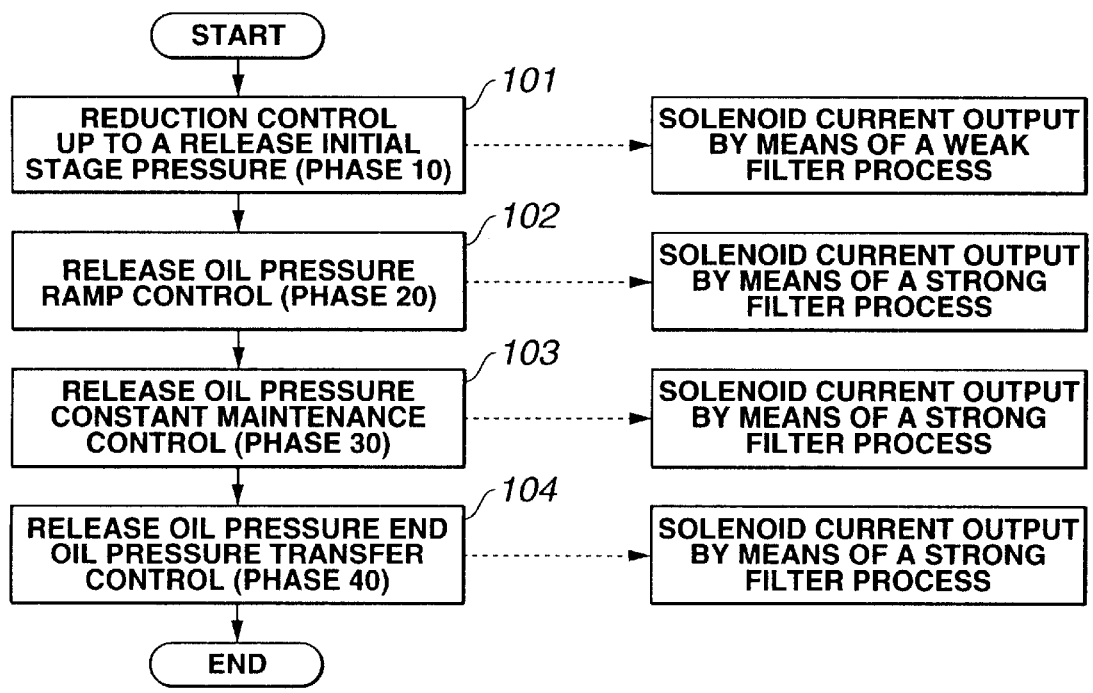
FIG. 7 is an operational flowchart representing a procedure of a hydraulic control for a release-side frictional element during a down-shift operation of the automatic transmission shown in FIG. 1A.

FIG. 7 shows an operational flowchart of a procedure of the hydraulic control of a release side frictional element during a down-shift operation. It is noted that automatic transmission controller 14, as shown in FIG. 1B, includes a microcomputer having a CPU 14a (Central Processing Unit), a ROM (Read Only Memory), a RAM (Random Access Memory), an Input Port, an Output Port, a common bus, a current drive circuit (having the filter), and other peripheral circuits.

First, at a step 101, controller 14 executes the hydraulic control during a time duration (phase 10) from instantaneous time $t_1$ at which a gear shift operation command is issued, the working oil pressure is reduced to instantaneous time $t_2$ at which the actual oil pressure has reached to a release initial pressure PRO (refer to FIGS. 5 and 6). At this time, the weak filtering is executed for the current signal to be inputted to the solenoid of the control valve.

At a step 102, controller 14 executes the hydraulic control such as to reduce the working oil pressure at a predetermined gradient (ramp). At this time, the strong filtering is applied to the current signal to be inputted to the solenoid of the control valve.

At a step 103, controller 14 executes the hydraulic control to maintain the working oil pressure at a constant value (shelf pressure) during the time duration from the instantaneous times $t_3$ to $t_4$ (phase 30). At this time, the strong filtering is applied to the current signal to be inputted to the solenoid of the control valve. Then, the present routine is ended.

At a step 104, such the hydraulic control as to 20 reduce the working oil pressure is executed. At this step, the strong filtering is carried out for the current signal to be inputted to the solenoid of the control valve.

Figure 8:
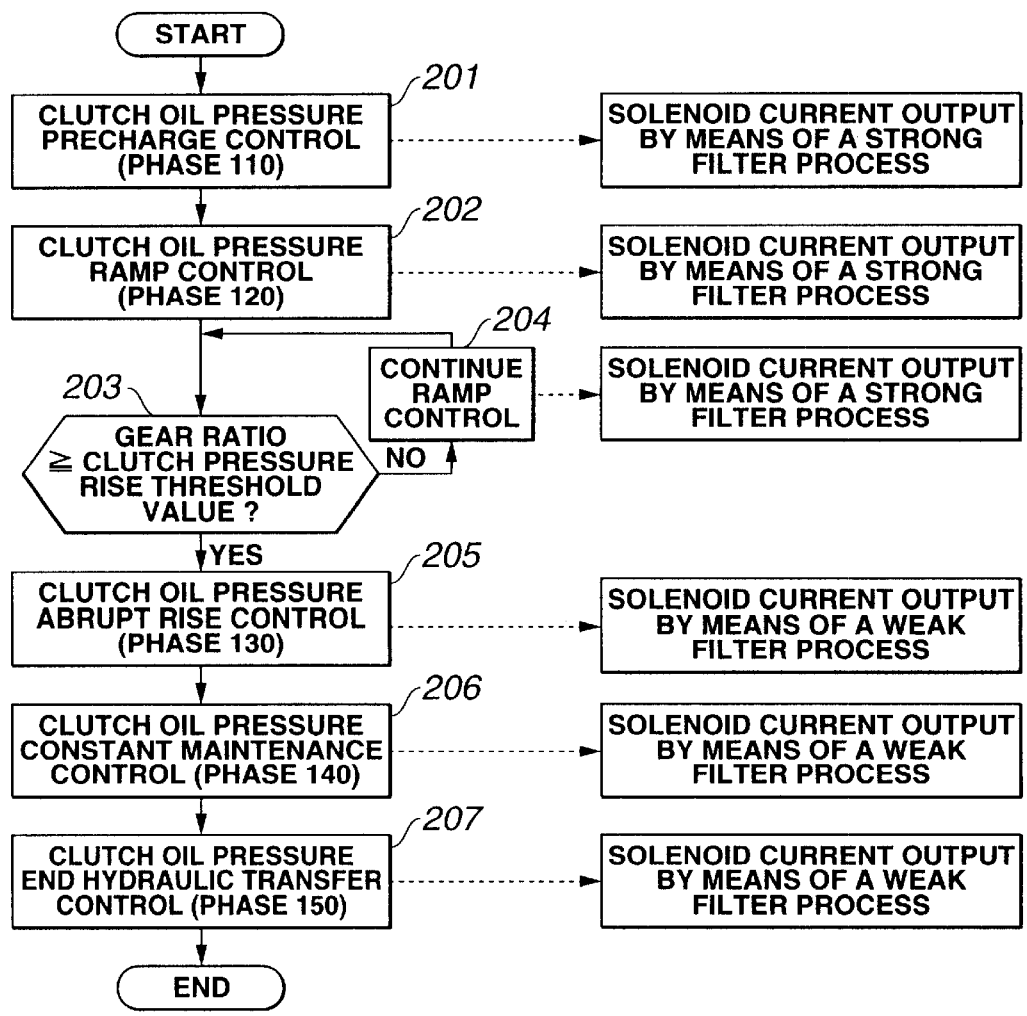
FIG. 8 is an operational flowchart representing a procedure of the hydraulic control for a clutch-side frictional element during the down-shift operation.

FIG. 8 is an operational flowchart representing a procedure of the hydraulic control of the release side frictional element during the down-shift operation.

At a step 201, controller 14 executes such the hydraulic control as to abruptly raise (pre-charge) the working oil pressure at the instantaneous time t1 at which the shift operation command is issued and maintain the working oil pressure for a predetermined time duration under a predetermined pressure (pre-charge pressure).

Thereafter, such the control as to reduce the clutching initial pressure PCO at the instantaneous time t21 is carried out (phase 110).

At the next step 202, controller 14 executes such the hydraulic control as to raise the working oil pressure at a predetermined gradient from the clutch initial pressure $P_{CO}$ (phase 120) as to be raised at a predetermined gradient. The strong filter process is carried out for the current signal to be inputted to the solenoid of the control valve.

At a step 203, the gear ratio is detected, the transmission controller 14 determines if the detected gear ratio has reached to a desired gear ratio, namely, whether the desired gear ratio has reached to a threshold value at which the working oil pressure is abruptly raised. It is noted that if the gear ratio has reached to a desired value or exceeded a threshold value, the routine goes to a step 205. If not reached to the threshold value, the routine goes to a step 204. At this step 204, the ramp control is continued to a desired value.

At step 205, such a control as to raise quickly the working oil pressure to a pressure $P_T$ (shelf pressure) from the instantaneous time $t_r$ at which the gear ratio has reached to a predetermined threshold value to the instantaneous time $t_{31}$ ("phase 130"). The weak filtering process is carried out for the current signal t the solenoid to drive the control valve.

At the next step 206, such the control as to maintain the working oil pressure at a constant value (shelf pressure) is carried out during a time duration from an instantaneous time $t_{31}$ to an instantaneous time $t_{41}$ (phase 140). It is noted that at this step the weak filtering is carried out for the current signal to be inputted to the solenoid to drive control valve 166. Then, at a step 207, such a control as to terminate the gear shift operation after an instantaneous time $t_{41}$ at phase 150. In this case, the weak filtering is carried out for the current signal to be inputted to the solenoid to drive the control valve. Then, the present routine is ended.

FIGS. 9A, 9B, 9C, and 9D show a timing chart and characteristic graphs representing the hydraulic control for the change-over gear shift operation in accordance with the above-described control procedure.

Figure 9A:
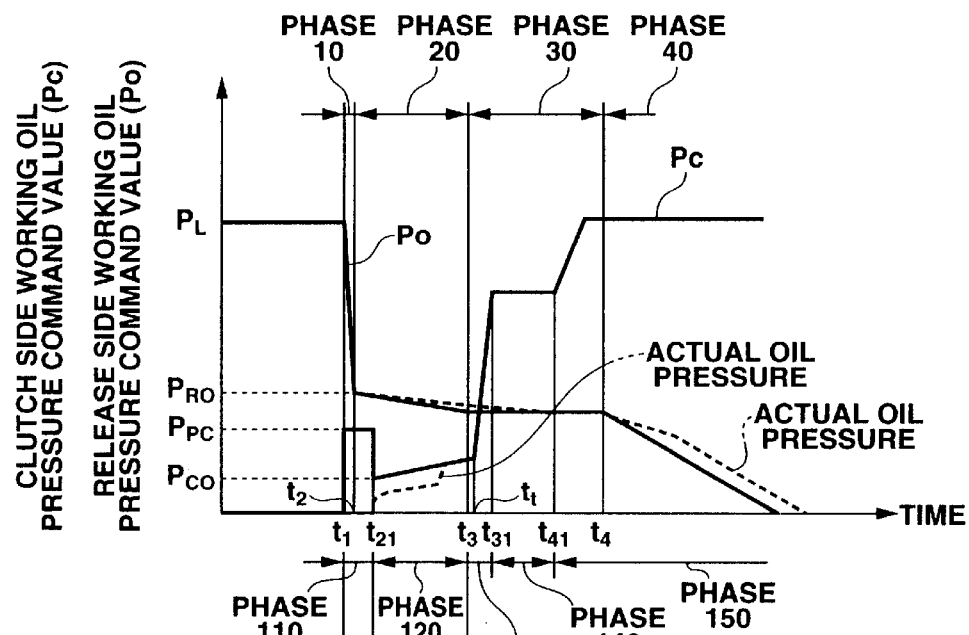
FIGS. 9A, 9B, 9C, and 9D are timing charts representing results of the hydraulic control during a change-over gear shift operation executed in accordance with the solenoid control method in the preferred embodiment according to the present invention.
Figure 9B:
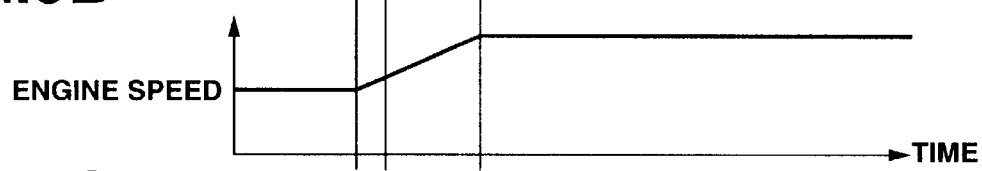
Figure 9C:
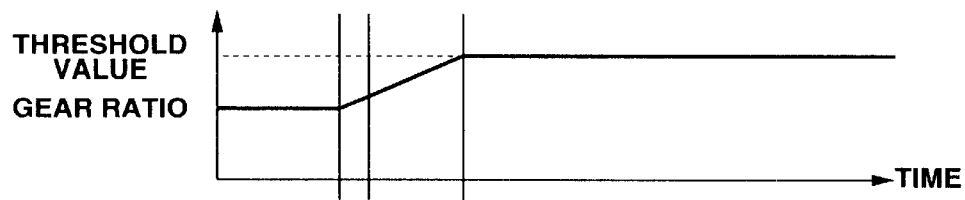

As described above, the filtering process is applied to the current signal to be inputted to the solenoid so that the actual oil pressure is transited as denoted by the broken line of FIG. 9A. Especially, it will be appreciated that the variation in engine speed and gear ratio at this time are shown in FIGS. 9B and 9C.

In a case where the hydraulic control used in accordance with the above-described control procedure, it will be appreciated that the engine racing does not occur.

Figure 9D:
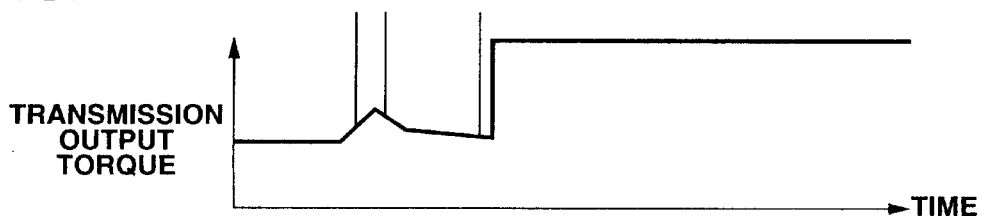

FIG. 9D shows the characteristic graph representing the variation in the transmission output torque. As shown in FIG. 9D, it will be appreciated that the variation in torque becomes relatively smooth so that a large gear shift shock does not occur.

FIGS. 10A, 10B, 10C, and 10D show a comparison-purpose timing chart and graphs to FIGS. 9A through 9D representing the hydraulic control on the change-over gear shift operation. In a case of FIGS. 10A through 10D, the strong filtering is applied to the current signal over a whole release side, a clutching side, and a control over the whole control interval of time.

Figure 10A:
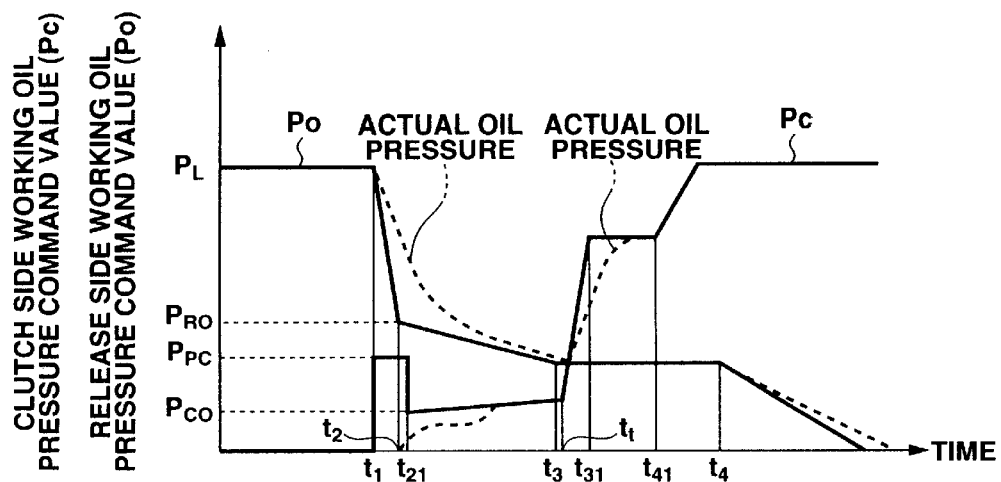
FIGS. 10A, 10B, 10C, and 10D are timing charts representing the results of the hydraulic control in a case where a strong filter is executed for the current signal to be inputted to the solenoid during a whole control interval of time in the change-over gear shift operation.
Figure 10B:
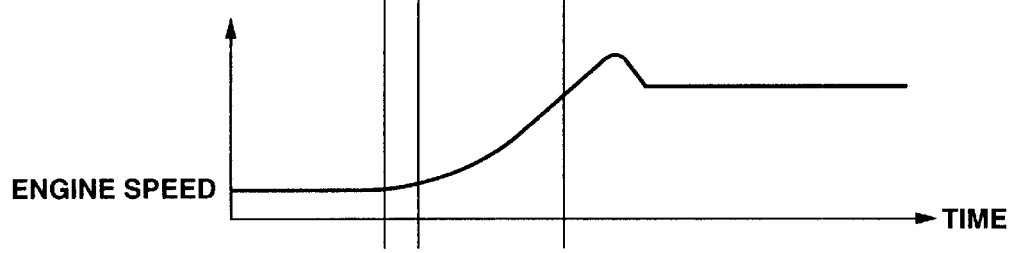
Figure 10C:
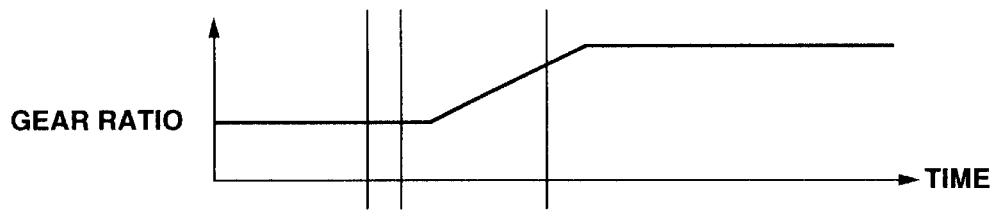
Figure 10D:
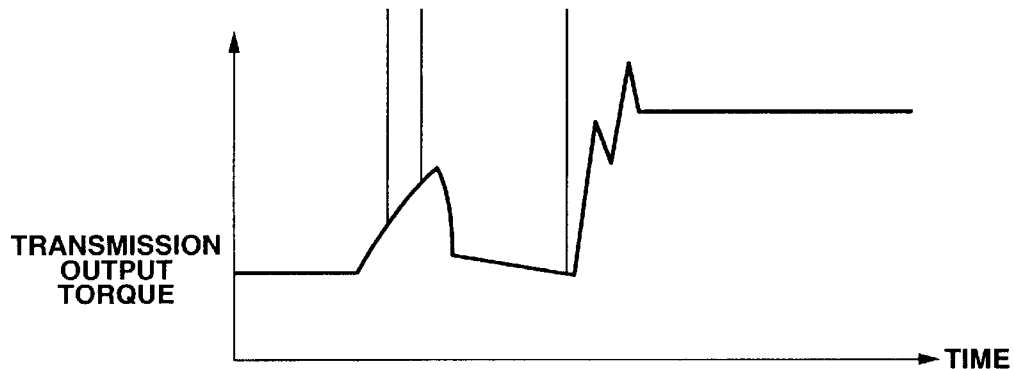

As appreciated from FIG. 10A, the following characteristic of the actual oil pressure for the release-side and clutch-side frictional elements to the command value is low as compared with the case of FIGS. 9A through 9D. Especially, as shown in FIG. 10B, it will be appreciated that the engine speed does not vary smoothly and a portion of the graph which is abruptly projected in an upward direction indicates an occurrence of engine racing. Furthermore, as shown in FIG. 10D, it will be appreciated that, according to the present invention, the response characteristic at the time of gear shift can be improved and the engine racing and shift shock can be suppressed.

entire contents of a Japanese Patent Application No. 2001-021653(filed in Japan on Jan. 30, 2001) are herein incorporated by reference. The scope of the invention is defined with reference to the following claims.

What is claimed is:

1. A solenoid control method for an automatic transmission, comprising:

causing a current signal varied in a stepwise manner to pass through a filter having a predetermined transfer function, the current signal being inputted to a solenoid to drive a control valve which a working oil pressure on at least one frictional element of the automatic transmission is controlled to perform a predetermined shift operation by r educing the working oil pressure to release the frictional element; and inputting the filter passed current signal to the solenoid to drive the control valve, wherein the frictional element comprises a plurality of frictional elements and wherein the automatic transmission performs such a change-over shift operation that, while a first frictional element is clutched in response to a rise in the working oil pressure thereon, a second frictional element is released in response to a reduction in the working oil pressure thereon and wherein, when a down-shift operation is carried out with the first frictional element clutched, the current signal is caused to pass through the filter and, thereafter, is inputted to each solenoid to drive the corresponding control valves for the first and second frictional elements at a phase after a gear ratio has reached a desired value.

2. A solenoid control method for an automatic transmission as claimed in claim 1, wherein the current signal is caused to pass through another filter which is weaker than the filter and, thereafter, is inputted to each solenoid to drive the control valves for the first and second frictional elements at a phase after the gear ratio has reached to the desired value.

3. A solenoid control method for an automatic transmission as claimed in claim 1, wherein, when the down-shift operation is carried out, the current signal is caused to pass through the filter and, thereafter, is inputted to one of the solenoids which is installed for the first frictional element, the first frictional element being clutched in response to the rise in the working oil pressure, at a phase from an instantaneous time at which a shift operation command is issued to an instantaneous time at which the gear ratio has reached to the desired value, the current signal is caused to pass through another filter which is weaker than the filter and, thereafter, is inputted to the solenoid which is installed for the first frictional element, at the subsequent phase after the gear ratio has reached to the desired value, and, on the other hand, the current signal is caused to pass through the filter and, thereafter, is inputted to another solenoid which is installed for the second frictional element, the second frictional element being released in response to a reduction in the working oil pressure thereon at the same time when the first frictional element is clutched in response to the rise in the working oil pressure thereon, at a phase from the instantaneous time at which the shift operation command is issued to an instantaneous time at which the working oil pressure of the second frictional element has been reduced to a predetermined release initial pressure, and is caused to pass through a still another filter which is stronger than the filter and, thereafter, is inputted to the other solenoid, at the subsequent phase after the working oil pressure on the second frictional element has reached to the predetermined release initial pressure.

4. A solenoid control method for an automatic transmission as claimed in claim 3, wherein each filter is a single filter having different time constants.

5. A solenoid control method for an automatic transmission as claimed in claim 3, wherein each filter has the predetermined transfer function as expressed below:

$G=K/(1+sT)$, wherein K denotes a gain, s denotes a differential operator (s=d/dt), and T denotes a time constant.

6. A solenoid control method for an automatic transmission as claimed in claim 4, wherein as the time constant T becomes larger, the filter becomes stronger.

7. A solenoid control method for an automatic transmission, comprising:

causing a current signal varied in a stepwise manner to pass through a filter having a predetermined transfer function, the current signal being inputted to a plurality of solenoids to drive corresponding control valves by which a working oil pressure on corresponding frictional elements of the automatic transmission is controlled to perform a predetermined shift operation by reducing the working oil pressure to release the frictional elements; and inputting the filter passed current signal to the solenoids to drive the control valves, wherein the automatic transmission performs such a change-over shift operation that, while a first frictional element is clutched in response to a rise in the working oil pressure thereon, a second frictional element is released in response to a reduction in the working oil pressure thereon and wherein, when a down-shift operation is carried out with the first frictional element clutched, the current signal is caused to pass through the filter and, thereafter, is inputted to the corresponding solenoids to drive the control valve for the first and second frictional elements at a phase after a gear ratio has reached a desired value.

* * * * *